US006177177B1

(12) United States Patent
Herrmann et al.

(10) Patent No.: US 6,177,177 B1
(45) Date of Patent: Jan. 23, 2001

(54) INK JET RECORDING MATERIAL COMPRISING AN AGENT EXHIBITING A CONCENTRATION GRADIENT.

(75) Inventors: Stefan Herrmann, Bonn; Jörg Hagemann, Köln; Günter Helling, Odenthal; Klaus Henseler, Köln; Jürgen Strobach, Kürten; Beate Weber, Leichlingen, all of (DE)

(73) Assignee: Agfa N.V. (BE)

( * ) Notice: Under 35 U.S.C. 154(b), the term of this patent shall be extended for 0 days.

(21) Appl. No.: 09/133,260

(22) Filed: Aug. 13, 1998

(30) Foreign Application Priority Data

Aug. 21, 1997 (DE) ............................................ 197 36 312

(51) Int. Cl.[7] ........................................................ B32B 7/02

(52) U.S. Cl. .......................... 428/212; 428/213; 428/215; 428/216; 428/218; 428/336; 428/481; 428/511; 428/513

(58) Field of Search .................................... 428/323, 212, 428/218, 213, 215, 216, 481, 511, 513, 336

(56) References Cited

U.S. PATENT DOCUMENTS

| | | | | |
|---|---|---|---|---|
| 4,124,386 | * | 11/1978 | Yoshida et al. | 96/29 D |
| 4,282,305 | * | 8/1981 | Brust et al. | 430/213 |
| 4,476,179 | * | 10/1984 | Moriguchi et al. | 428/216 |
| 4,681,796 | * | 7/1987 | Maehashi et al. | 428/212 |
| 5,043,318 | * | 8/1991 | Kawakami et al. | 503/227 |
| 5,348,931 | * | 9/1994 | Mochizuki et al. | 503/227 |
| 5,429,860 | * | 7/1995 | Held et al. | 428/195 |
| 5,589,269 | * | 12/1996 | Ali et al. | 428/411.1 |
| 5,908,723 | * | 7/1999 | Malhotra et al. | 430/31 |

FOREIGN PATENT DOCUMENTS 609 930 1/1994 (EP) .

* cited by examiner

*Primary Examiner*—H. Thi Le
(74) *Attorney, Agent, or Firm*—Connolly Bove Lodge & Hutz LLP

(57) ABSTRACT

Particularly smudge-resistant ink jet images are produced with an ink jet recording material which comprises a support, at least one layer applied to the support and an agent which binds ink jet dyes in a spread- and smudge-resistant manner, wherein the agent exhibits a concentration gradient such that the further is the agent from the support, the lower is the concentration.

20 Claims, No Drawings

INK JET RECORDING MATERIAL COMPRISING AN AGENT EXHIBITING A CONCENTRATION GRADIENT.

FIELD OF THE INVENTION

This invention relates to an ink jet recording material having improved properties.

BACKGROUND OF THE INVENTION

The ink jet process is known (cf. for example the chapter, "Ink jet printing" by R. W. Kenyon in *Chemistry & Technology of Printing & Imaging Systems,* editor Peter Gregory, Blackie Academic & Professional, Chapman & Hall, 1996, pp. 113–138, and the literature cited therein).

In this process, ink jet images are produced by spraying a fine, imagewise modulated jet of a dye solution or dispersion onto a recording material. Better quality recording materials have an image-receiving layer on a support material, the layer containing an agent intended to bind the ink jet dye in a spread- and smudge-resistant manner. DP 609 930 accordingly discloses the provision of an ink receiving layer on the support, the layer containing at least one mordant which is a polymer or copolymer having a phosphonium group. The stated document gives a comprehensive description of the prior art relating to ink jet materials. The results achieved hitherto are, however, not adequate.

SUMMARY OF THE INVENTION

The object of the invention was to provide an ink jet recording material with which in particular smudge resistant ink jet images are produced.

This object is achieved with an ink jet recording material which comprises a support, at least one layer applied to the support and an agent which binds ink jet dyes in a spread- and smudge-resistant manner, characterised in that the agent exhibits a concentration gradient such that the further is the agent from the support, the lower is the concentration.

DETAILED DESCRIPTION OF THE INVENTION

The subordinate claims describe preferred embodiments of the invention.

The material may be produced in a single operation by means of a cascade or curtain coater, as is known from the production of photographic silver halide materials, starting from the support material and a coating solution for each layer to be applied. Once the support has been coated with at least two coatings solutions, the material is dried and is then ready to use.

Suitable agents which bind ink jet dyes in a spread- and smudge-resistant manner are, for example cationic mordants, dye-complexing compounds, aluminium hydroxide.

Cationic mordants are preferred because azo dyes having acidic groups are conventionally used as ink jet dyes.

Suitable cationic mordants are, for example, compounds from the classes of optionally quaternised polyvinylpyridines, optionally quaternised polyvinylimidazoles, poly(di)allylammonium compounds, optionally quaternised polydialkylaminoalkyl (meth) acrylates, optionally quaternised polydialkylammoniumalkyl (meth)acrylamides, polyvinylbenzyldi- or trialkylammonium compounds, polyesters having quaternary ammonium groups, polyamides having quaternary ammonium groups, polyurethanes having quaternary ammonium groups, polymers prepared from N,N,N-trialkyl-N-(meth) acrylamidobenzylammonium compounds. Preferred mordants are copolymers prepared from at least 45 wt. % of vinylpyrrolidone and at least 20 wt. % of a monomer having a quaternary nitrogen atom.

The cationic mordants may be soluble or dispersible in water. The cationic mordants have an average molecular weight (weight average) of preferably at least 2000, in particular at least 20000.

Compounds containing phosphonium groups (EP 609 930) may also be used as mordants, as may ground cationic ion exchange resins which are finely dispersed in the mordant layer.

Some examples are shown below.

B-1

MW 25000

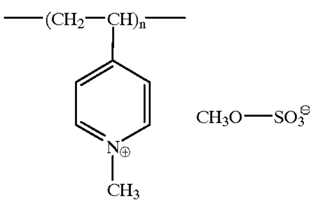

B-2

MW 45000

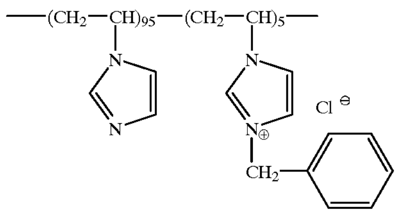

B-3

MW 30000

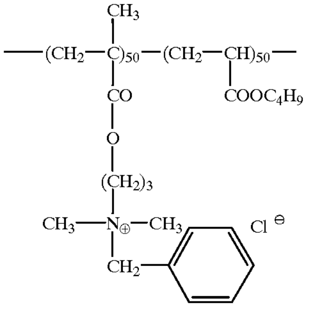

B-4

MW 67000

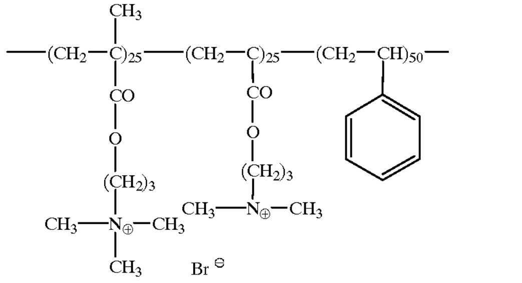

-continued
B-5
MW > 10,000,000
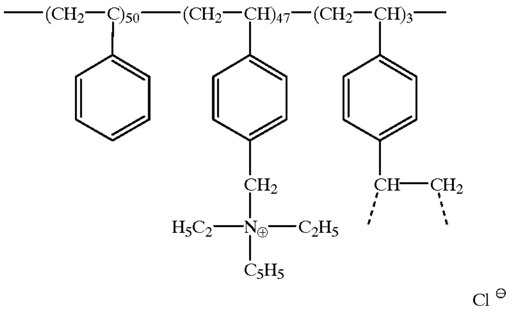
B-6
MW > 10,000,000
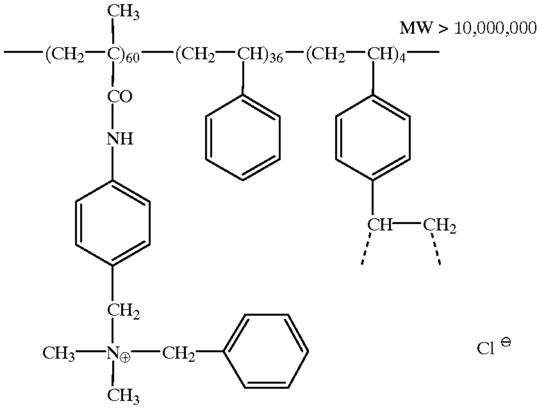
B-7
MW 16000
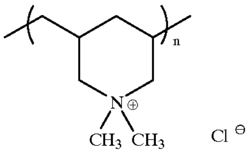
B-8
MW 9000
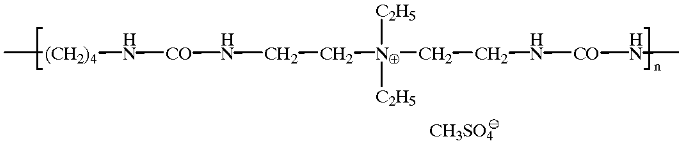
B-9
MW 10000
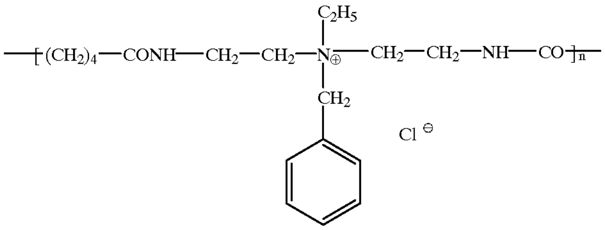
B-10
MW 9500
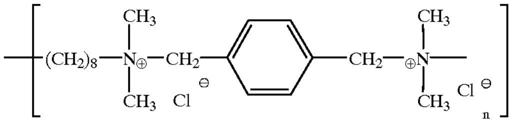
B-11
MW 50000
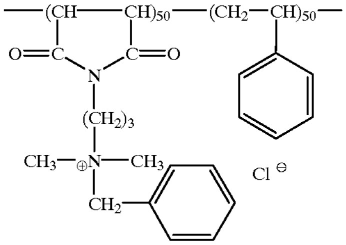
B-12
MW 100 000
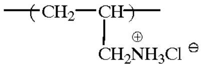

-continued

B-13

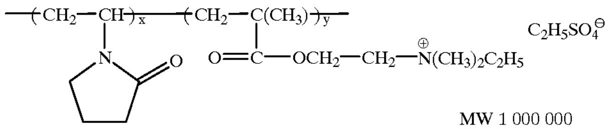

MW 1 000 000 x = 70 wt. %; y = 30 wt. %

The dashed bonds in B-5 and B-6 denote crosslinking of the molecule with further chains of the same kind.

A continuous mordant gradient may, for example, be produced by allowing an agent which inhibits the functioning of the mordant to diffuse inwards from the outside.

Suitable binders for the applied layers are described in *Research Disclosure* 37254, part 2 (1995), page 286 and *Research Disclosure* 38957, part IIA (1996), page 598.

Gelatine is preferred.

Suitable spacers are in particular spherical, have an average diameter of 1 to 50 μm, in particular of 5 to 20 μm and have a narrow grain size distribution.

Suitable spacers consist, for example, of polymethyl methacrylate, polystyrene, polyvinyltoluene, polyamide, silicon dioxide and insoluble starch.

The support preferably has a thickness of 80 to 250 μm, in the case of polyester- or polyolefin-laminated paper, the paper in particular has a thickness of 80 to 220 μm, the polyester or polyolefin layers in particular have a thickness of 5 to 20 μm each. Polyethylene is the preferred polyolefin, polyethylene terephthalate the preferred polyester.

In order to prevent curling of the material, the support may also have a binder layer on the opposite side to the receiving layer, the binder preferably being the same as that in the receiving layer.

A layer arranged above the layers containing mordant preferably contains a UV absorber.

Suitable UV absorbers are described in *Research Disclosure* 24239 (1984), 37254, part 8 (1995), page 292, 37038, part X (1995), page 85 and 38957, part VI (1996), page 607 and EP 306 083 and 711 804.

In a preferred embodiment, at least one layer, preferably a layer containing mordant, contains an image stabiliser. Suitable image stabilisers are known from *Research Disclosure* 37254, part 8 (1995), page 292 and 38957, part X (1996), pages 621 et seq., and from DE 43 37 862, GB 20 88 777, EP 373 573, EP 685 345 and EP 704 316.

Suitable UV absorbers are, for example, compounds of the formulae (I) and (II):

(I)

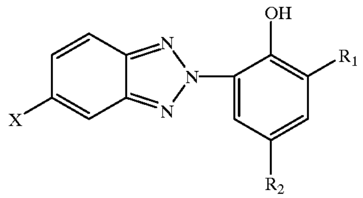

| | | | |
|---|---|---|---|
| I-1 | $R_1$=s-$C_4H_9$ | $R_2$=t-$C_4H_9$ | X=H |
| I-2 | $R_1$=$R_2$=t-$C_4H_9$ | | X=C1 |
| I-3 | $R_1$=$R_2$=t-$C_5H_{11}$ | | X=H |
| I-4 | $R_1$=H | $R_2$=t-$C_8H_{17}$ | X=H |
| I-5 | $R_1$=t-$C_{12}H_{25}$ | $R_2$=$CH_3$ | X=H (isomeric mixture) |
| I-6 | $R_1$=t-$C_4H_9$ | $R_2$= —$CH_2CH_2$—$CO_2$—$C_8H_{17}$ | X=Cl |

(II)

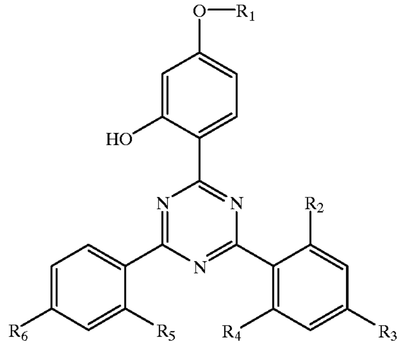

II-1 $R_1 = C_8H_{17}$, $R_2 = R_3 = R_5 = R_6 = CH_3$, $R_4 = H$

II-2 $R_1 = C_6H_{13}$, $R_2$–$R_6$ = H

II-3 $R_1 = —CH_2—CH(OH)—CH_2—O—C_{12-16}H_{25-33}$ (mixture)

$R_2 = R_3 = R_4 = R_5 = R_6 = H$

II-4 $R_1 = —CH_2—CH(OH)—CH_2—O—C_4H_9$ $R_2 = R_3 = R_4 = CH_3$, $R_5 = OH$,
$R_6 = —O—R_1$

-continued (II)

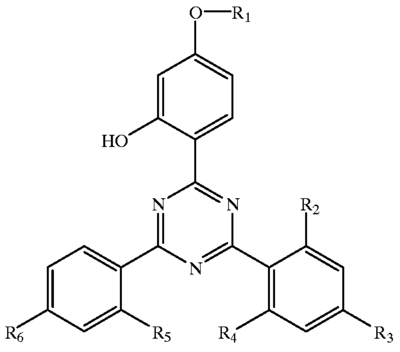

II-5 $R_1 = -CH_2-CH(C_2H_5)-C_4H_9$ $R_2 = R_3 = R_4 = H$, $R_5 = OH$, $R_6 = -O-R_1$

II-6 $R_1 = -CH_2-CH(OH)-CH_2-O-C_4H_9$ $R_2 = R_5 = OH$, $R_3 = R_6 = -O-R_1$, $R_4 = H$

II-7 $R_1 = C_{13}H_{27}$-i, $R_2 = R_5 = OH$, $R_3 = R_6 = -O-R_1$, $R_4 = H$ (isomeric mixture)

In another embodiment of the invention, the material contains agents which improve the optical properties of the material, preferably optical brighteners. These agents are preferably introduced into a layer beneath the layer furthest from the support, particularly preferably in a layer beneath the receiving layer. Suitable compounds are described in *Research Disclosure* 37254, part 8 (1995), pages 292 et seq. and 38957, part VI (1996), pages 607 et seq.

Suitable hardeners are described in *Research Disclosure* 37254, part 9 (1995), page 294; 37038, part XII (1995), page 86 and 38957, part IIB (1996), pages 599 et seq.

Examples of hardeners are:

H-1

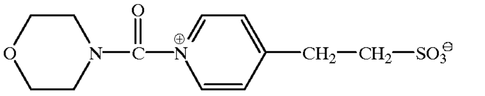

H-2

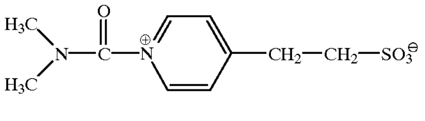

$H_2C{=}CH-CH_2-SO_2-CH_2-CH{=}CH_2$ H-3

$(H_2C{=}CH-CH_2-SO_2-CH_2)_2-O$ H-4

H-5

$[(H_2C{=}CH-CH_2-SO_2-CH_2)_3-C-CH_2-SO_2-CH_2-CH_2]_2-NH-CH_2CH_2SO_3^{\ominus}\ K^{\oplus}$ $(H_2C{=}CH_2-CH_2-SO_2-CH_2-CO-NH-CH_2)CH_2-$ H-6

H-7

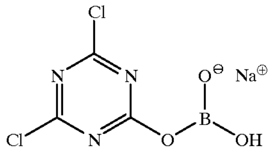

H-8

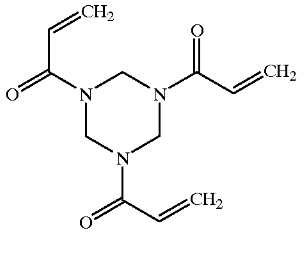

H-9

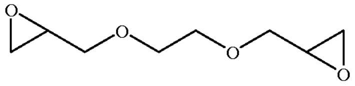

H-10

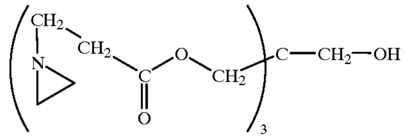

A quantity of 0.005 to 10 wt. %, relative to the hardenable binder, preferably of 0.01 to 1 wt. %, is conventionally used.

EXAMPLES

The following solutions are produced:

Solution 1a 17 g of 20 wt. % mordant B-13, 167 g of 20 wt. % lime-processed gelatine, 8 g of emulsifier E-1, 808 g of demineralised water, adjusted to pH 7.5.

Solution 1b

As solution 1a with 8.5 g of 20 wt. % mordant B-13.

Solution 1c

As solution 1a with 3.5 g of 20 wt. % mordant B-13.

Solution 1c

As solution 1a with 1.7 g of 20 wt. % mordant B-13.

Solution 2

19.3 g of UV absorber I-1, 3.4 g of UV absorber I-6, 11.3 g of diisononyl adipate, 86 g of 20 wt. % lime-processed gelatine, 260 g of 10 wt. % phthaloyl gelatin, 30 g of emulsifier E-1, 590 g of demineralised water, adjusted to pH 7.5.

Solution 3

130 g of 20 wt. % lime-processed gelatine, 260 g of 10 wt. % phthaloyl gelatine, 30 g of emulsifier E-1, 10 g of polymethyl methacrylate particles having an average particle size of 5 μm, 570 g of demineralised water, adjusted to pH 7.5.

Solution 4

19.3 g of UV absorber I-1, 3.4 g of UV absorber I-6, 11.3 of diisononyl adipate, 86 g of 20 wt. % lime-processed gelatine, 260 g of 10 wt. % phthaloyl gelatin, 10 g of polymethyl methacrylate particles having a particle size of 5 μm, 30 of emulsifier E-1, 580 g of demineralised water, adjusted to pH 7.5.

Solution 5

276 g of 20 wt. % lime-processed gelatine, 100 g of 5 wt. % polyvinylpyrrolidone solution ($M_w$=360000), 62 g of 20 wt. % polyethyl acrylate solution, 62 g of 10 wt. % solution of optical brightener W-1, 10 g of emulsifier E-1, 490 g of demineralised water, adjusted to pH 7.5.

Solution 6

375 g of 20 wt. % lime-processed gelatine, 8.3 ml of emulsifier E-1, 617 ml of demineralised water, adjusted to pH 7.5.

Ink jet recording materials are produced by coating paper, which is coated on both sides with polyethylene and is of a total thickness of 180 μm, with the solutions described above in the following manner:

Sample 1

Solution 1b is applied to the substrate in a coating machine to a wet film thickness of 124 μm and dried.

Sample 2

Solutions 1b and 3 are applied to the substrate in such a manner that solution 1 is coated directly onto the substrate to a wet film thickness of 124 μm and solution 3 is coated thereon to a wet film thickness of 30 μm.

Sample 3

Solutions 5, 1b and 3 are applied to the substrate in such a manner that solution 5 is coated directly onto the substrate to a wet film thickness of 20 μm and solutions 1a and 3 are coated thereon to a wet film thickness of 124 and 30 μm respectively.

Sample 4

Solutions 5, 1b and 4 are applied to the substrate in such a manner that solution 5 is coated directly onto the substrate to a wet film thickness of 20 μm and solutions 1a and 4 are coated thereon to a wet film thickness of 124 and 30 μm respectively.

Sample 5

Solutions 1b, 1c and 1d are applied to the substrate in such a manner that solution 1b is coated directly onto the substrate to a wet film thickness of 41 μm and solutions 1c and 1d are coated thereon each to a wet film thickness of 41 μm.

Sample 6

Solutions 1a, 1b, 1c and 1d are applied to the substrate in such a manner that solution 1a is coated directly onto the substrate to a wet film thickness of 50 μm and solutions 1b, 1c and 1d are coated thereon to a wet film thickness of 40, 25 and 10 μm respectively.

Sample 7

Solutions 1a, 1b, 1c and 1d and 3 are applied to the substrate in such a manner that solution 1a is coated directly onto the substrate to a wet film thickness of 50 μm and solutions 1b, 1c and 1d and 3 are coated thereon to a wet film thickness of 40, 25, 10 and 30 μm respectively.

Sample 8

Solutions 1a, 1b, 1c, 1d 2 and 3 are applied to the substrate in such a manner that solution 1a is coated directly onto the substrate to a wet film thickness of 50 μm and solutions 1b, 1c, 1d, 2 and 3 are coated thereon to a wet film thickness of 40, 25, 10, 20 and 20 μm respectively.

Sample 9

Solutions 5, 1b, 1c, 1d and 3 are applied to the substrate in such a manner that solution 5 is coated directly onto the substrate to a wet film thickness of 20 μm and solutions 1b, 1c, 1d and 3 are coated thereon to a wet film thickness of 40, 25, 10 and 30 μm respectively.

Sample 10

Solutions 5, 1b, 1c, 1d and 4 are applied to the substrate in such a manner that solution 5 is coated directly onto the substrate to a wet film thickness of 20 μm and solutions 1b, 1c, 1d and 4 are coated thereon to a wet film thickness of 40, 25, 10 and 30 μm respectively.

Sample 11

As sample 6, but solution 7 is additionally coated onto the reverse of the substrate to a wet film thickness of 125 μm.

Sample 12

As sample 9, but solutions 5, 1b, 1c, 1d and 3 are additionally applied to the reverse of the substrate in such a manner that solution 5 is coated directly onto the substrate to a wet film thickness of 20 μm and solutions 1b, 1c, 1d and 3 are coated thereon to a wet film thickness of 40, 25, 10 and 30 μm respectively.

Sample 13

As sample 6, but hardening is performed by the addition of 120 mg/m$^2$ of hardener H-1.

Sample 14

As sample 9, but hardening is performed by the addition of 150 mg/m$^2$ of hardener H-1.

Sample 15

As sample 10, but hardening is performed by the addition of 150 mg/m$^2$ of hardener H-1.

Sample 16

As sample 12, but the coatings on the front and reverse are each hardened by the addition of 150 mg/m$^2$ of hardener H-1.

Samples 1 to 4 are comparison samples, while samples 5 to 16 are samples according to the invention.

The following tests are performed with an HP 870 CXi printer as the test device using conventional commercial inks. The black ink contains pigments.

Test A

The dried samples are printed with coloured areas of the colours cyan, magenta, yellow, black, red, green and blue using an HP 870 CXi printer. The printed output is pressed against a sheet of white copier paper (80 g/m$^2$) using a rubber roller and the time until no colour transfer may any longer by measured is determined. Apparent gloss is also assessed visually and rated (mark 1:high gloss; mark6:very matt).

| Sample no. | Drying time [min] | Gloss [mark 1–6] | Comment |
|---|---|---|---|
| 1 | 6 | 5 | Comparison |
| 2 | 4 | 4 | Comparison |
| 3 | 4 | 4 | Comparison |
| 4 | 5 | 4 | Comparison |
| 5 | 4 | 2 | According to the invention |
| 6 | 4 | 2 | According to the invention |
| 7 | 3 | 1 | According to the invention |
| 8 | 3 | 2 | According to the invention |
| 9 | 3 | 1 | According to the invention |
| 10 | 4 | 2 | According to the invention |
| 11 | 4 | 2 | According to the invention, front tested |
| 12 | 3 | 1 | According to the invention, front tested |
| 13 | 4 | 2 | According to the invention |
| 14 | 3 | 1 | According to the invention |
| 15 | 4 | 1 | According to the invention |
| 16 | 3 | 1 | According to the invention, front tested |

The drying time of the samples according to the invention is somewhat improved relative to the comparison sample, while gloss is distinctly improved.

Test B

The samples are printed with the three primary colours cyan, magenta, and yellow and then exposed to $20\times10^6$ lux×h of light from a 100 klux xenon lamp which has a spectrum similar to that of natural daylight. The percentage reduction in density is measured.

| Sample no. | DD (cyan) | DD (magenta) | DD (yellow) |
|---|---|---|---|
| 5 | 18 | 22 | 20 |
| 6 | 21 | 23 | 22 |
| 8 | 16 | 15 | 17 |
| 10 | 15 | 15 | 16 |
| 15 | 15 | 14 | 17 |

The preferred use of an image stabiliser in samples 8, 10 and 15 brings about substantially better protection of the dyes from light.

Test C

The unprinted samples are immersed for 0.5 minutes in distilled water at a temperature of 20 and 70° C. After drying, the coating is assessed visually.

| Sample no. | Water temp.: 20° C. | Water temp.: 70° C. | Comments |
|---|---|---|---|
| 6 | partial delamination | complete delamination | |
| 9 | partial delamination | complete delamination | |
| 10 | complete delamination | complete delamination | |
| 12 | partial delamination | complete delamination | layer on reverse also delaminated |
| 13 | no visible change | no visible change | |
| 14 | no visible change | no visible change | |
| 15 | no visible change | no visible change | |
| 16 | no visible change | no visible change | reverse unchanged |

The preferred hardening allows the production water-resistant layer without any degradation of drying time and gloss.

Test D

The sensitivity of the material is estimated by rubbing printed areas of colour with a finger. The value stated is the time until no smudging any longer occurs.

| Sample no. | Cyan [min] | Magenta [min] | Black [min] |
|---|---|---|---|
| 5 | 5 | 6 | 6 |
| 6 | 5 | 7 | 7 |
| 7 | 2 | 3 | 2 |
| 8 | 2 | 3 | 3 |
| 9 | 2 | 2 | 2 |
| 10 | 2 | 3 | 3 |
| 14 | 2 | 2 | 2 |
| 15 | 2 | 3 | 2 |

The preferred use of spacers in the uppermost layer of samples 7 to 10, 14 and 15 brings about a distinct improvement in the abrasion resistance of the dyes.

Test E

Minimum yellow density, determined by densitometry, is used as a measure of the "apparent whiteness" of the material.

| Sample no. | $D_{min}$ (yellow) | Comment |
|---|---|---|
| Substrate | 0.10 | Standard |
| 5 | 0.09 | |
| 6 | 0.09 | |
| 13 | 0.09 | |
| 9 | 0.05 | |
| 10 | 0.04 | |
| 14 | 0.04 | |
| 15 | 0.04 | |

The preferred use of optical brighteners brings about a distinct improvement in the image whites in samples 9, 10 and 14.

Test F

The unprinted samples are stored for 2 days at 23° C. ,and 50% relative humidity; curling is then measured by placing a DIN A4 sheet with its underside on a level surface and measuring the height of the corners above the surface.

| Sample no. | Curl [mm] | Comment |
|---|---|---|
| Substrate | 0 | Standard |
| 8 | 16 | |
| 9 | 22 | |
| 13 | 14 | |
| 14 | 20 | |
| 11 | 3 | |
| 12 | 4 | |
| 15 | 2 | |
| 16 | 3 | |

The preferred coating of the reverse side with a binder layer (samples 11, 12, 15 and 16) brings about a considerable reduction in curl.

The compounds used in the Examples:

E-1

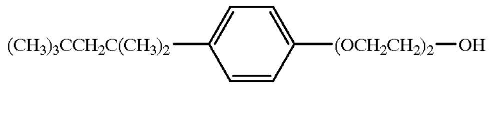

W-1

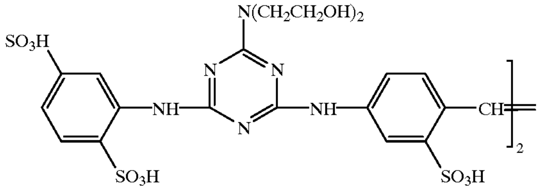

What is claimed is:

1. An ink jet recording material which comprises a support, at least one binder layer applied to the support and an agent which binds ink jet dyes in a spread-and smudge-resistant manner, said agent being selected from the group consisting of cationic mordants, dye-complexing compounds and aluminum hydroxide and said agent exhibits a concentration gradient such that the further the agent is from the support, the lower is the concentration.

2. An ink jet recording material according to claim 1, wherein the concentration gradient is continuous.

3. An ink jet recording material according to claim 1, wherein the concentration gradient is stepped.

4. An ink jet recording material according to claim 3, wherein the concentration gradient has at least two steps.

5. An ink jet recording material according to claim 3, wherein the concentration gradient has at least three steps.

6. An ink jet recording material according to claim 3, wherein at least one layer is coated for each step.

7. An ink jet recording material according to claim 1, wherein the support has been coated with at least two coating solutions and contains at least two layers and wherein the layer furthest from the support contains spacers.

8. An ink jet recording material according to claim 1, wherein the binder is gelatine.

9. An ink jet recording material according to claim 1, wherein the support is a paper laminated on both sides with a polyolefin or a polyester.

10. The ink jet recording material according to claim 9, wherein said support has a thickness of 80 to 220 μm and the polyester or polyolefin layers have a thickness of 5 to 20 μm each.

11. An ink jet recording material according to claim 1, wherein the agent which binds the ink jet dyes in a spread- and smudge-resistant manner is a cationic mordant.

12. The ink jet recording material according to claim 11, wherein said cationic mordant has an average molecular weight of at least 2000.

13. The ink jet recording material according to claim 12, wherein the cationic mordant has an average molecular weight of at least 20,000.

14. An ink jet recording material according to claim 1, wherein the agent which binds the ink jet dyes in a spread- and smudge-resistant manner is used in a quantity of 0.2 to 25 wt. %, relative to the binder.

15. An ink jet recording material according to claim 1, wherein the agent which binds the ink jet dyes in a spread- and smudge-resistant manner is a copolymer obtained by copolymerising a monomer having a quaternary nitrogen atom and at least 45% of vinylpyrrolidone.

16. The ink jet recording material according to claim 15, wherein there is at least 20 wt. % of a monomer having a quaternary nitrogen atom.

17. An ink jet recording material according to claim 1, wherein the support is coated with at least two layers each having a different concentration of the agents.

18. An ink jet recording material according to claim 17, wherein the support is coated with at least two layers which each have a different thickness.

19. An ink jet recording material according to claim 17, wherein the support is coated with at least three layers which each have a different thickness.

20. An ink jet recording material according to claim 17, wherein each layer is coated with a different thickness.

* * * * *